United States Patent [19]

Gold et al.

[11] 4,041,367
[45] Aug. 9, 1977

[54] APPARATUS FOR GENERATING ALTERNATING CURRENTS OF ACCURATELY PREDETERMINED WAVEFORM

[75] Inventors: Bernard Samuel Gold, Cheam; Peter Alan Smithers, Crawley, both of England

[73] Assignee: Roband Electronics Limited, Horley, England

[21] Appl. No.: 658,742

[22] Filed: Feb. 17, 1976

[30] Foreign Application Priority Data

Feb. 21, 1975 United Kingdom ............... 7490/75

[51] Int. Cl.² .................................. H02P 13/20
[52] U.S. Cl. ................................. 363/97; 363/80; 323/DIG. 1
[58] Field of Search .............. 332/38, 43 B; 323/DIG. 1; 321/9 A, 16, 18, 19

[56] References Cited

U.S. PATENT DOCUMENTS

| 3,226,630 | 12/1965 | Lampke | 321/9 A |
| 3,710,229 | 1/1973 | Jessee | 321/9 A |
| 3,875,496 | 4/1975 | Carsten | 321/18 |

OTHER PUBLICATIONS

Proceedings of the 4 Intersociety Energie Conversion Engineering Conference, Wash. D. C. pp. 854–860, Sept. 1969.

Primary Examiner—William H. Beha, Jr.
Attorney, Agent, or Firm—Lawrence E. Laubscher

[57] ABSTRACT

To ensure that alternating current supplied to a load has an accurately predetermined voltage waveform each terminal of the load is connected to a d.c. source by way of a respective switching regulator receiving as its reference voltage an alternating voltage of the predetermined waveform and of appropriate phase. If the load is a reactive load each switching regulator is a push-pull regulator enabling the respective load terminal to be connected to either terminal of the d.c. supply. The switching regulators preferably operate at a duty cycle having a repetition rate which is a high multiple of the frequency of the alternating current to be supplied. The regulator operation may be additionally controlled to ensure that the alternating voltages appearing at the load terminals are balanced to earth.

5 Claims, 6 Drawing Figures

1

APPARATUS FOR GENERATING ALTERNATING CURRENTS OF ACCURATELY PREDETERMINED WAVEFORM

BACKGROUND OF THE INVENTION

1. Field of the invention

Much present-day electronic equipment operates with optimum performance and reliability only when supplied with reasonably accurately sinusoidal alternating voltage. In many applications the available alternating voltage supplies are, or often become, of seriously imperfect waveform. This is particularly so if, as is often the case it is found necessary to employ a constant-voltage transformer in order to ensure that the voltage supplied to an equipment shall remain within close tolerances.

2. Description of the Prior Art

It has been proposed in order to supply a load with an accurately predetermined alternating waveform to employ accurate-waveform generators, which are very expensive to construct and maintain or to employ low-frequency oscillators which seldom have sufficiently accurate waveforms. Elaborate arrangements using photoelectric cells cylically exposed to light passing a moving mask or appropriate shape have also been used, but such apparatus involving moving elements is insufficiently reliable for many applications.

It is also advantageous in some applications to be able to provide an a.-c. supply of a frequency other than those normally available.

SUMMARY OF THE INVENTION

It is an object of the present invention to provide a means wherein an electronic equipment or other load may be supplied with alternating voltage of which the waveform may be very accurately of any desired waveform and of constant amplitude.

An embodiment of a circuit arrangement according to the invention for providing to an electrical load an alternating current of predetermined voltage waveform includes d.-c. supply means having positive and negative poles; alternating voltage source means providing an alternating voltage of said predetermined waveform, and a switching regulator operating to couple a pole of said d.-c. supply means to a terminal of said load in a variable duty cycle; said switching regulator comprising control means responsive to any difference between the potential at said load terminal and said alternating voltage to vary said duty cycle so as to reduce said difference.

DESCRIPTION OF THE PREFERRED EMBODIMENT

Figure 1:
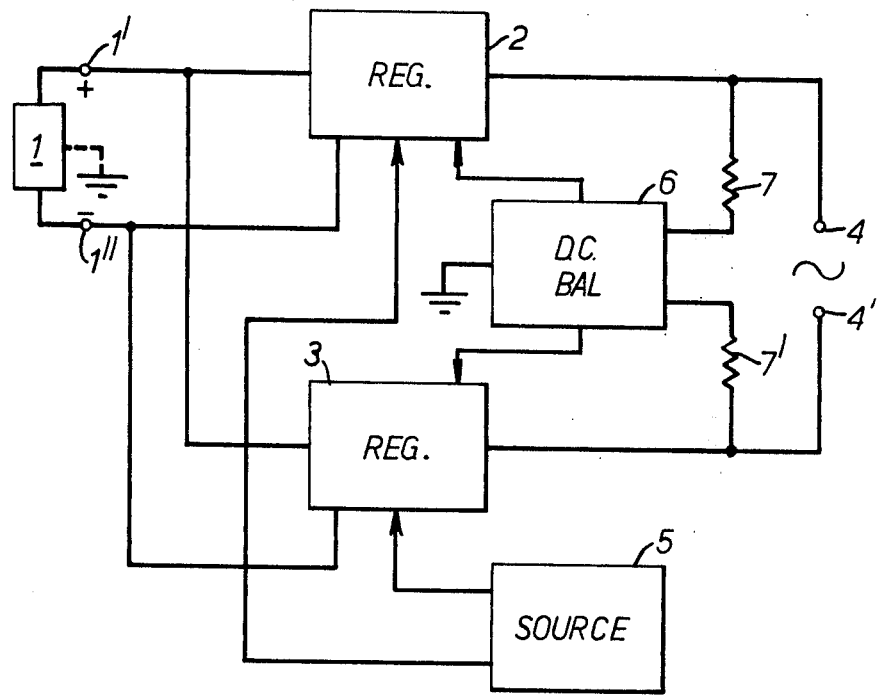
FIG. 1 is a block diagram of an embodiment of apparatus in accordance with the invention.

In FIG. 1 a direct-voltage from a suitable supply 1 is received at terminals 1', 1", the polarity being as indicated. The positive terminal of the direct voltage supply is coupled by way of individual switching regulators 2, 3 to alternating voltage output terminals 4, 4' respectively. Regulators 2, 3 are arranged to receive, as their reference voltages, antiphased voltages of the required supply waveform which are provided by a source 5. Thus terminals 4, 4' are fed with voltages having accurately the desired waveform whatever the nature of the load current. It may be desired that the voltages at terminals 4, 4' shall be balanced with respect to ground. When this is so a d.c. balance circuit 6, as described below with reference to FIG. 2, is fed with the potentials at those terminals by way of a pair of resistors 7, 7', connected in series between terminals 4, 4' and circuit 6, and is arranged appropriately to change the d.c. levels of the terminals when an unbalanced condition is detected.

It will be appreciated by those skilled in the art that a plural-phase alternating voltage supply may be similarly obtained, it being only necessary to provide a pair of switching regulators for each phase lead and to provide these regulators with appropriately mutually phase-displaced reference voltages of the desired waveform.

Figure 2:
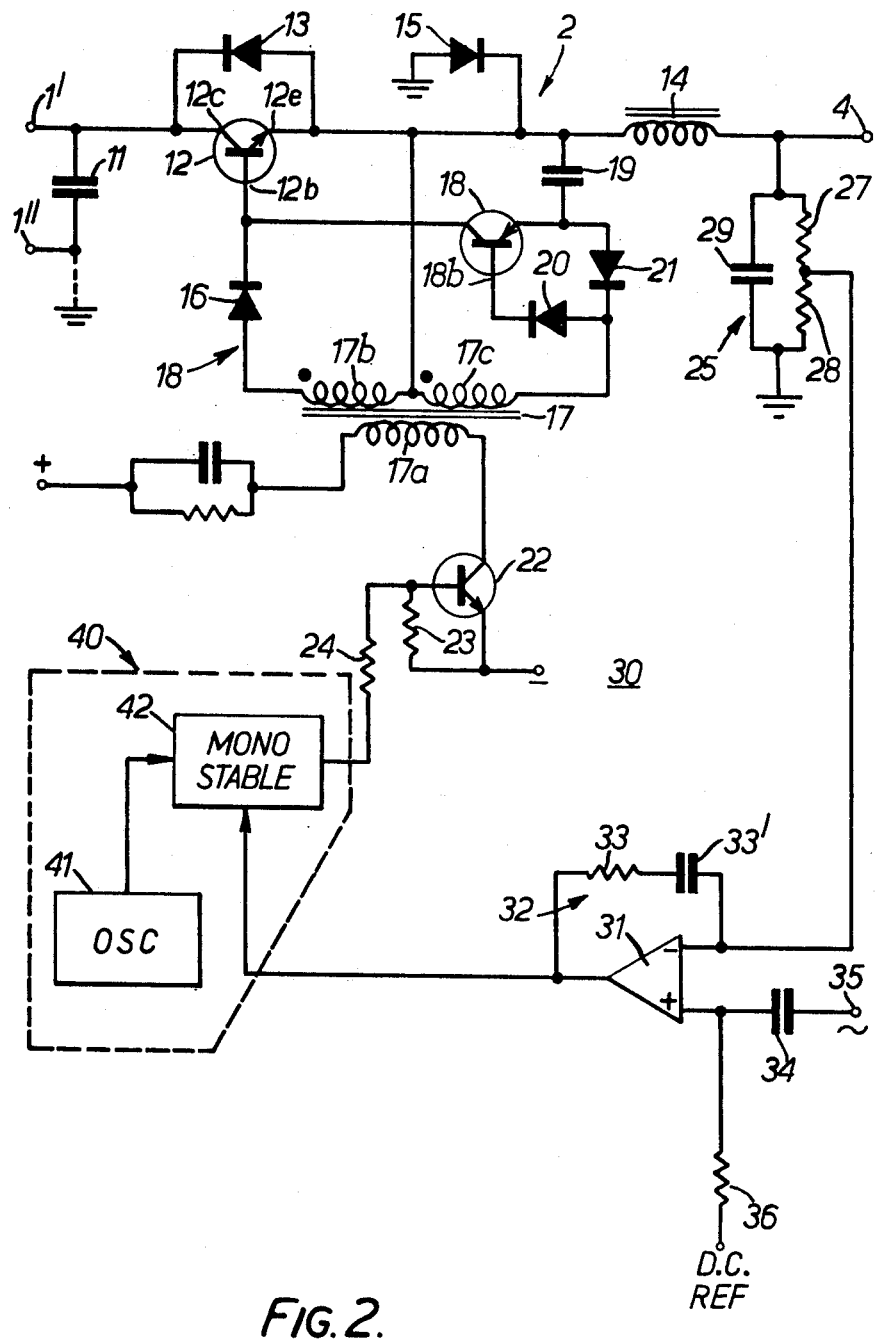
FIG. 2 is a circuit diagram showing in more detail a part of the apparatus of FIG. 1 and suitable for supplying a resistive load.

The circuit arrangement of FIG. 2 may be regarded as representing regulator 2 and part of d.c. balance circuit 6 of FIG. 1. The positive supply received at terminal 1 is bypassed to ground by a capacitor 11. The switch performing the regulating function is here constituted by a n-p-n transistor 12, the collector-emitter path of which is shunted by an inverted diode 13. The emitter 12e of switching transistor 12 is taken to output terminal 4 by way of an inductor 14, the junction between emitter and inductor being taken to ground by way of an inverted diode 15.

The base of switching transistor 12 is driven positively to turn on the transistor by pulses applied to it from a drive transformer 17. Transistor 12 is fed from transformer 17 by way of a rapid turn-off circuit 18. The secondary winding 17b of transformer 17 is connected between the emitter 12e and the base 12b of transistor 12 by way of a diode 16 and at the end of each pulse is coupled by way of a transistor 18 to a capacitor 19 which is returned to the emitter 12e of transistor 12 and at this time is negatively charged. Thus charge carriers are very rapidly withdrawn from the base 12b of transistor 12, so that a rapid turn-off is obtained.

Transistor 18 is turned on by positive pulses applied to its base 18b by way of a diode 20 from a tertiary winding 17c on drive transformer 17, which is connected in antiphase with secondary winding 17b and thus applies positive-going voltage to diode 20 at the end of each turn-on pulse for transformer 12. The turn-on pulses themselves will develop negative-going voltages in tertiary winding 17c and these are applied by way of a diode 21 to charge capacitor 19 in the appropriate polarity.

The drive pulses applied to the primary winding 17a of transformer 17 are provided by an n-p-n transistor 22 which controls the flow of current through winding 17a from a d.c. source, represented only by terminals + and −. The base of transistor 22 is returned through a resistor 23 to its emitter and is fed by way of a resistor 24 with positive-going pulses of appropriately modulated duration provided by a pulse duration modulator 40 which, as will become apparent, may take different forms. In the present embodiment pulse duration modulator 40 comprises a monostable trigger circuit 42. Trigger 42 is set to generate a drive pulse by signals received from an oscillator 41, which operates at a frequency which is many times, preferably a high multiple of, the frequency of the required alternating output voltage. When the required output frequency is 50, 60 or 400 Hz, oscillator 26 may conveniently operate at a frequency of 20 kHz, and returns to its reset condition to terminate the pulse at the end of a period determined by a control potential applied to a control input of the trigger. The energy passing through switching transistor 12 at each cycle of oscillator 41 is thus determined by the instantaneous value of the control potential, which is developed as described below.

A potential representing the instantaneous value of the output potential at terminal 4 is taken from the tapping of a resistive voltage divider 25 connected across the output of regulator 2. In the present embodiment potential divider 25 is formed by resistors 27, 28 connected in series between output terminal 4 and ground and shunted by a capacitor 29 of which the value is chosen to prevent substantial variation of the output voltage during one cycle of oscillator 41. The potential appearing at the junction of resistors 27, 28 is fed to a control circuit 30, in which it is applied to the inverting input of an amplifier 31. Negative feedback is applied from the output of amplifier 31 to its inverting input by way of a feedback network here comprising the series combination of a resistor 32 and a capacitor 33. To the non-inverting input of amplifier 31 is applied by way of a capacitor 34 the alternating reference voltage of predetermined waveform received at terminal 35 from the reference source. Amplifier 31 thus provides an error signal output representative of the difference between the output voltage at terminal 4 and the reference voltage. This error signal is applied to control the duration of the output pulses of pulse width modulator 40, the duration of these pulses being increased as the difference voltage becomes greater.

When it is desired to provide at terminals 4, 4' of FIG. 1 an alternating voltage which is balanced with respect to ground, the d.c. source 1 is arranged to provide positive and negative voltages balanced with respect to ground and there is also applied to the non-inverting input of amplifier 31 by way of a resistor 36 a direct voltage representing the desired mean potential of terminals 4, 4'.

It will be understood that switching regulator 3 and its control circuits will be similar to those described above with reference to FIG. 2, save that the regulator 3 will be connected between terminals 1" and 4', while the alternating reference voltage applied to the control circuit at 35 will be in antiphase with that applied to regulator 2.

Figure 3:
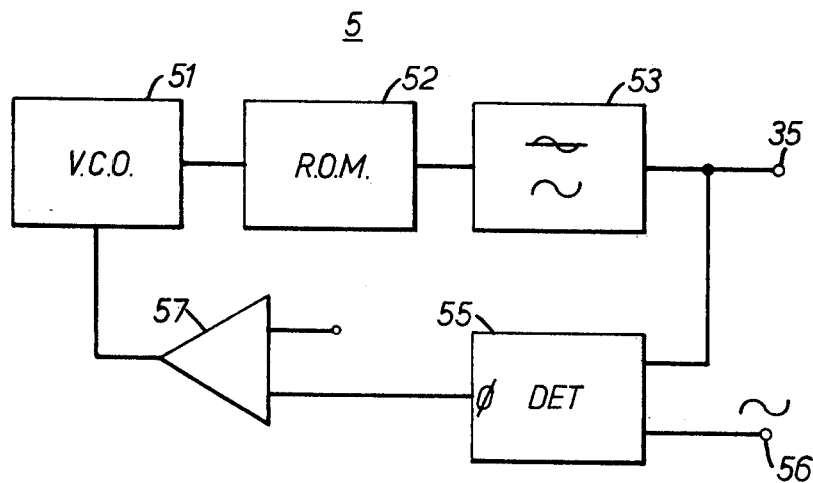
FIG. 3 is a block diagram of an advantageous embodiment of a component of FIG. 1.

FIG. 3 represents an advantageous arrangement for use as reference source 5. A voltage-controlled oscillator 51 yields a cyclic output signal, the repetition rate of which is dependent upon the direct voltage applied to a control input. The output of oscillator 51 is applied to drive a read-only memory 52, so that the memory yields at its output a cyclically repetitive signal representing each in turn of the values stored in the memory. Memories of this kind presently available may store 8 bits per word and a total of 1024 words. Thus a very accurate digital representation of one cycle of an alternating waveform may be contained in the memory and may be repeatedly read out at whatever frequency is required. If a 50Hz sinusoidal waveform is to be produced using such a memory then oscillator 51 will be arranged to develop a mean output frequency of 50, 120 Hz and the individual words of the memory will represent sinusoidally varying digital values.

The memory is arranged to yield output potentials representing the analogue value of each stored word in succession. This output is fed through a low-pass filter 53 to an output terminal 35, from which the reference potential thus developed is fed to the switching regulators 2, 3, an inverter (not shown) being interposed in one case. When it is desired that the alternating voltage produced shall be phase-locked with an existing A.C. source, then the signal appearing at output terminal 44 is applied to one input of a phase-sensitive detector 55, to the other input of which is applied by way of terminal 56 a voltage taken from the existing A.C. source. The output of the phase-sensitive detector is applied by way of an amplifier 57 to the control input of voltage-controlled oscillator 51. Any difference in phase between the voltage of the existing source and the output potential at terminal 44 will then produce a change in oscillator frequency such as to correct the phase error.

Figure 4:
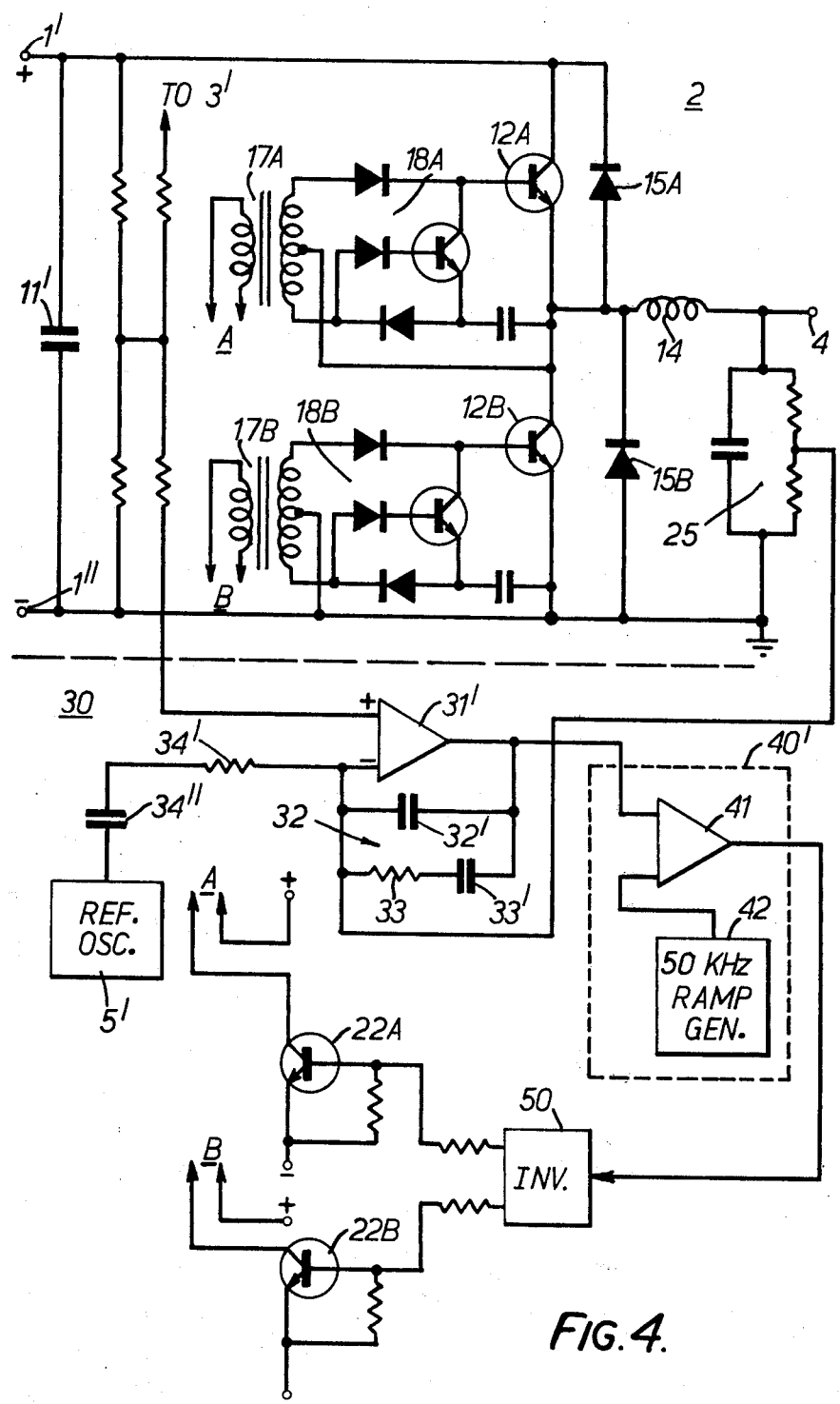
FIG. 4 is a circuit diagram showing a part of the apparatus of FIG. 1 suitable for supplying a reactive load.

FIG. 4 shows an alternative arrangement of switching regulator which provides the advantage over that of FIG. 2 that it will provide current of the predetermined waveform into a reactive load. To this end, transistor 12 of FIG. 2 is replaced by a push-pull pair of transistors 12A, 12B having their collector-emitter paths connected in series across supply terminals 1' and 1". By way of the common point of these transistors, the emitter of transistor 12A being connected to the collector of transistor 12B, the output terminal 4 of the regulator may be connected to either the positive d.c. supply terminal 1' or the negative terminal 1", as necessary to produce the required output waveform. Each of transistors 12A, 12B is shunted by a respective diode 15A, 15B and their common point is connected by way of an inductor 14 to output terminal 4.

Each of transistors 12A, 12B has a rapid turn-off circuit 18A, 18B of the same kind as turn-off circuit 18 described with reference to FIG. 2.

Across the regulator output is connected a potential divider 25 which provides to a control circuit 30' in which it is applied to the inverting input of an amplifier 31', to which input there is also applied by way of a resistor 34' and a capacitor 34" the predetermined waveform output of reference oscillator 5. Amplifier 31' has a negative feedback path 32 consisting in this case of a capacitor 32' in parallel with the series combination of a resistor 33 and a capacitor 33'. As in the embodiment of FIG. 2, amplifier 31' provides at its output an error signal representing the discrepancy between the actual and desired output potential at any time. The error signal from the output of amplifier 31' is applied to a pulse-duration modulator 40', consisting in this embodiment of a comparator amplifier 41, to one input of which is applied the error signal while its other input receives the output signal from a 50 kHz ramp generator 42. The output signal of modulator 40' thus comprises pulses of which the duration varies with the amount of the discrepancy between the actual and desired output potentials. This signal is applied to an inverter circuit 50 providing a direct and an inverted output for driving transistors 12A, 12B. In order to prevent any risk of transistors 12A, 12B becoming conductive at the same time, due to insufficiently rapid turn-off of one transistor despite the presence of circuits 18A, 18B, inverter circuit 50 preferably provides mutually inverted output signals which are not exactly in antiphase but provide a small interval (conveniently of some 1 - 2/µS) in which neither transistor is conductive. A suitable circuit arrangement is described further below with reference to FIG. 5.

The two outputs of inverter circuit 50 are applied respectively to the base of two driver transistors 22A, 22B having in their collector circuits the primary windings of transistors 17A, 17B by which transistors 12A, 12B are driven.

Figure 5:
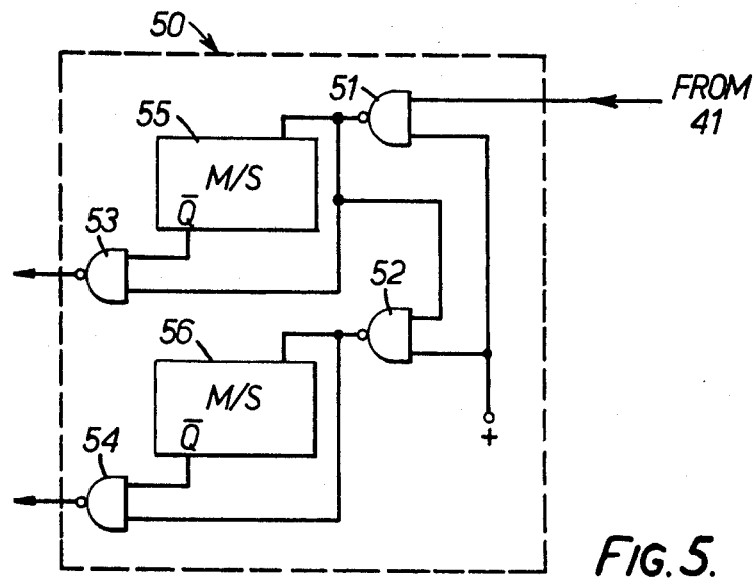
FIG. 5 is a logic diagram of a part of the apparatus of FIG. 4.

FIG. 5 shows one form of circuit arrangement which is advantageously used to provide the inverter circuit 50 of FIG. 4. The pulse signal received from modulator 40' is applied to one input of a NAND gate 51, the other input of which is permanently enabled by being connected to the + line. The output of gate 51 is applied to one input of a second NAND gate 52, the second input of which is again permanently enabled. The output of first NAND gate 51 is also applied to one input of a third NAND gate 53, the remaining inputs of gate 53, being derived from the $\overline{Q}$ output of monostable circuit 55, which is initiated by the output of gate 51. The output of second NAND gate 52 is applied to the input of a fourth NAND gate 54, the remaining input of gate 54 being derived from the Q output of a monstable circuit 56, initiated by the output of gate 52.

The arrangement described above provides mutually inverted square-wave signals, the rising transients in each signal being delayed with respect to the falling transient in the other signal by the amount of the delay set by the monostable devices, these delays being equal.

Figure 6:
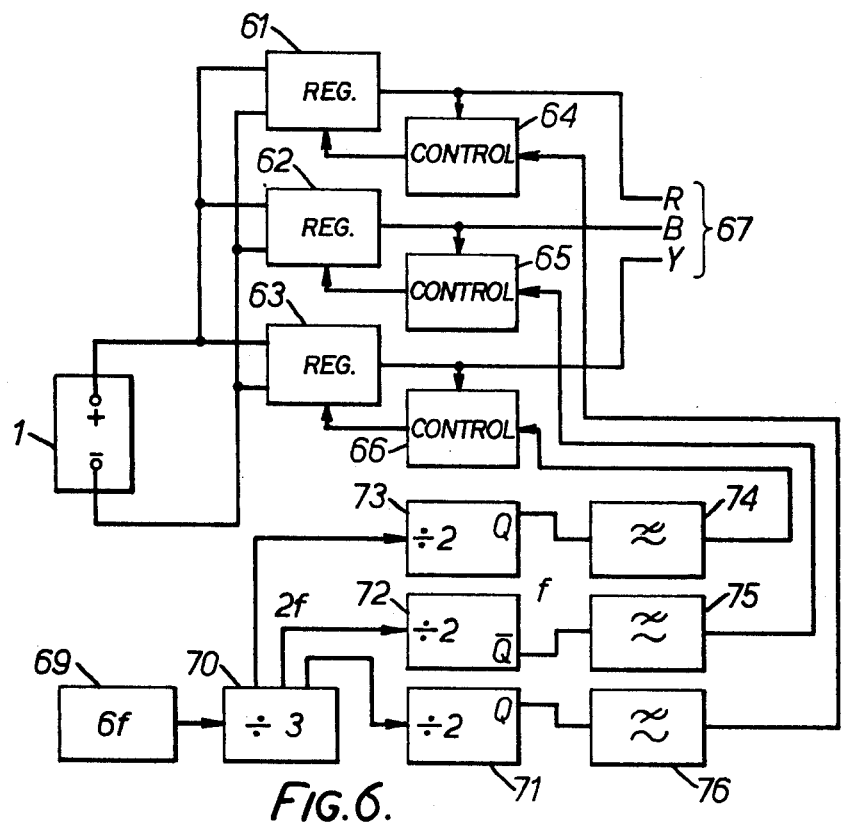
FIG. 6 is a schematic diagram of an embodiment of the invention for providing a three-phase output.

FIG. 6 illustrates an embodiment of the invention by which a three-phase alternating current output may be provided. A d.c. source 1 is coupled by way of respective switching regulators 61, 62, 63 having respective control circuits 64, 65, 66, to provide respective phase outputs R, B and Y of a three-phase output 67. To provide the appropriate three-phase controlling alternating voltage there is provided an oscillator 69 operating at a frequency 6f, where f is the required frequency of the alternating current to be supplied. The output of oscillator 69 drives a divide-by-three ring counter 70, from the three stages of which are taken individual outputs at a common frequency 2f, but mutually displaced in phase by 120°. The three outputs of ring counter 70 are applied to the individual binary counters 71, 72, 73, the direct outputs Q of counters 71 and 73 being taken, with the inverter output $\overline{Q}$ of counter 72, thus providing output signals with a common frequency f, mutually phase-displaced by 120°. The output signals of dividers 71–73 are fed through respective low-pass filters 74, 75, 76 to regulate control circuits 64, 65, 66 to provide the necessary three-phase control.

It is essential to provide known gating arrangements to ensure that the bistable devices 71, 72, 73 always operate in the appropriate sequence and thus provide outputs in the correct relative phases.

What is claimed is:

1. A circuit arrangement for providing to an electrical load an a.-c. supply of predetermined voltage waveform; said circuit arrangement comprising, in combination:

direct current supply means having positive and negative poles;
   reference generator means developing reference alternating voltages of said predetermined waveform in respective phases corresponding to the number of said load terminals;
   and comprising, for each said load terminal, control means comprising amplifier means having an input and an output means developing a monitor signal representative of the potential at a said load terminal, and means applying said monitor signal and a respective said reference alternating voltage in opposition to said amplifier input thereby developing at said amplifier output an error signal representing the difference between said monitor and reference signals;
   ramp generator means developing a cyclically repetitive ramp voltage at a repetition rate that is a high multiple of the frequency of said reference voltages;
   modulator means comprising a comparator amplifier having two inputs and an output and yielding an output signal at said output when a signal applied to a first said input exceeds a signal applied to the other said input, and means applying said ramp voltage to said first comparator input and said error signal to said second comparator input whereby said comparator provides at its output a pulse train that is pulse-duration modulated in accordance with the magnitude of said error signal;
   inverter means having an input and two outputs and yielding at said two outputs in response to a pulse train applied to said input respective direct and inverter pulse trains in each of which transitions in a first direction are delayed with respect to corresponding transitions in the other said pulse train;
   means applying said comparator output signal to said inverter input;
   respective first and second pulse driven transistor switching means coupled each said pole of said direct current supply means with said load terminal; and
   means applying said direct and inverted pulse trains respectively to drive said first and second switching means.

2. An electrical circuit for providing an alternating current supply of predetermined voltage waveform to an electrical load having a plurality of load terminals, comprising
   a. direct current supply means having positive and negative poles;
   b. reference generator means generating reference alternating voltages of said predetermined waveform in respective phases corresponding to the number of said load terminals;
   c. control means for each of said load terminals, said control means including
      1. comparator means having two inputs and one output and generating at said output an output signal representing the difference between signals applied to said inputs;
      2. means for generating a monitor signal representative of the potential at each one of said load terminals;
      3. means for applying one of said reference alternating voltages to one of said comparator input terminals; and
      4. means for applying said monitor signals to the other of said comparator input terminals, whereby said comparator output signal is an error signal representing the difference between said monitor and reference signals;

d. modulator means comprising a monostable circuit having a trigger input and a control input and generating output pulse signals having a duration varying in accordance with the magnitude of a signal applied to said control input and in response to repetitive signals applied to said trigger input;
e. drive oscillator means generating drive pulses at a repetition rate that is a high multiple of the frequency of said reference source means;
f. means applying said drive pulses to the trigger input of said monostable circuit;
g. means applying said error signal to the control input of said monostable trigger circuit;
h. pulse-driven transistor switching means coupling each pole of said load terminals in response to pulse signals applied thereto; and
i. means applying said monostable circuit output pulses to drive said switching circuit.

3. An electrical circuit for providing an alternating current having a predetermined voltage waveform to an electrical load having a plurality of terminals, comprising
   a. direct current supply means having positive and negative poles;
   b. reference source means for providing a reference alternating voltage of predetermined frequency and in a number of phases equal to the number of said plurality of load terminals;
   c. switching regulator means arranged to couple each of said load terminals with one or the other of the poles of said direct current supply means, respectively, in accordance with a variable periodic duty cycle, said switching regulator means further including
      1. a first transistor switching circuit arranged to couple said positive pole of said direct current supply means to one of said load terminals, and
      2. a second transistor switching circuit arranged to couple said negative pole of said direct current supply means to another of said load terminals;
   d. error signal means responsive to the potential at each of said load terminals and to the voltage of a respective phase of said reference alternating voltage to develop an error signal representing the difference between said potential and said voltage, wherein each of said switching regulator means is arranged to couple the respective load terminal with one or the other of said poles of said direct current supply means in accordance with the polarity of said error signal, said error signal means further comprising
      1. means for combining said reference voltage phase with a potential derived from that at said load terminal to develop said error signal;
      2. comparator means producing an output signal when a signal applied to a first input thereof exceeds that applied to a second input thereof;
      3. ramp generator means from which periodic ramp signals are applied to said first input of said comparator;
      4. means applying said error signal to said second input of said comparator;
      5. inverter means yielding a direct pulse train and an inverted pulse train in response to an input thereof;
      6. means applying the output signal of said comparator means to said inverter means; and
      7. means applying said direct and inverted pulse trains from said inverter means to control said first and second transistor switching circuits, respectively; and
   e. control means varying said switching regulator duty cycle in accordance with said error signal to reduce the difference between the potential at each of said load terminals and the voltage of a respective phase of said reference alternating voltage.

4. An electric circuit as defined in claim 3 wherein said inverter means provides said direct and inverted pulse trains in which the leading turn-on pulse edges of each said pulse train are delayed with respect to the turn-off edges of the other pulse train.

5. An electrical circuit as defined in claim 4 wherein said inverter means comprises
   a. first, second, third and fourth two-input NAND gates; first and second monostable devices, said comparator output signal being applied to a first gate of said first NAND gate, the output signal of said first NAND gate being applied to a first input of said NAND gate and to a first input of said third NAND gate;
   c. an enabling potential source; and
   d. means connecting said source to the second input of each of said first and second gates, the output of said first gate being also applied to the input of said first monostable device, the output of said second gate being applied to the input of said first gate being further applied to a first input of said third gate and the delayed output of said first monostable device being applied to the second input of said third gate, the output of said second monostable device being applied to a first input of said fourth gate and the output of said second gate being further applied to the second input of said fourth gate, the outputs of said third and fourth gates forming said direct and inverted output pulse trains.

* * * * *